US010809991B2

(12) United States Patent
Tung et al.

(10) Patent No.: US 10,809,991 B2
(45) Date of Patent: Oct. 20, 2020

(54) SECURITY MODEL FOR LIVE APPLICATIONS IN A CLOUD COLLABORATION PLATFORM

(71) Applicant: salesforce.com, inc., San Francisco, CA (US)

(72) Inventors: Julie Tung, Los Altos, CA (US); Rajeev Nayak, San Francisco, CA (US); Kevin Gibbs, San Francisco, CA (US); Bret Taylor, Lafayette, CA (US); Yang Su, San Francisco, CA (US); Nate Botwick, San Francisco, CA (US); Diana Berlin, San Francisco, CA (US); Pedram Razavi, San Francisco, CA (US); Scott Goodfriend, Berkeley, CA (US); Nikrad Mahdi, San Francisco, CA (US); Andy Chung, Berkeley, CA (US); Drew Hamlin, San Francisco, CA (US); Patrick Linehan, San Francisco, CA (US); Sophia Westwood, San Francisco, CA (US); Lindsey Simon, San Francisco, CA (US); Shrey Banga, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 15 days.

(21) Appl. No.: 16/264,068

(22) Filed: Jan. 31, 2019

(65) Prior Publication Data
US 2020/0133650 A1 Apr. 30, 2020

Related U.S. Application Data

(60) Provisional application No. 62/751,058, filed on Oct. 26, 2018, provisional application No. 62/751,074, filed on Oct. 26, 2018.

(51) Int. Cl.
G06F 8/60 (2018.01)
G06F 8/71 (2018.01)
(Continued)

(52) U.S. Cl.
CPC ............... *G06F 8/60* (2013.01); *G06F 8/34* (2013.01); *G06F 8/36* (2013.01); *G06F 8/71* (2013.01);
(Continued)

(58) Field of Classification Search
None
See application file for complete search history.

(56) References Cited

U.S. PATENT DOCUMENTS

| 7,966,370 B1 * | 6/2011 | Pegg | H04N 7/15 707/608 |
| 8,819,617 B1 * | 8/2014 | Koenig | G06F 8/70 717/101 |

(Continued)

OTHER PUBLICATIONS

Triton, "Web Security Help", 2014, Published by TRITON™ Web Security Solutions., at https://www.websense.com/content/support/library/web/v78/triton_web_help/excep_add-edit_explain.aspx (Year: 2014).*

(Continued)

Primary Examiner — Hossain M Morshed
(74) Attorney, Agent, or Firm — Sterne, Kessler, Goldstein & Fox P.L.L.C.

(57) ABSTRACT

Disclosed herein are system, method, and computer program product embodiments for providing a security model to customizable live applications in a cloud collaboration platform. The security approach may dedicate a frame to each live application, serving the frame from a different domain than a document in which the live application is embedded. This approach ensures that more stringent security requirements may be required of the live application and allows the (Continued)

data presented to the live application to be narrowly tailored. The security model may further leverage sandbox attributes and content-security policies to restrict the behavior of sandboxed and non-sandboxed live applications in accordance with best security practices.

20 Claims, 9 Drawing Sheets

(51) Int. Cl.
| | |
|---|---|
| G06F 9/451 | (2018.01) |
| G06F 8/34 | (2018.01) |
| G06F 21/31 | (2013.01) |
| G06F 9/50 | (2006.01) |
| G06F 21/56 | (2013.01) |
| G06F 8/36 | (2018.01) |
| G06F 16/901 | (2019.01) |
| G06F 9/54 | (2006.01) |
| G06F 12/0871 | (2016.01) |
| G06F 21/53 | (2013.01) |
| H04L 29/06 | (2006.01) |
| H04L 29/08 | (2006.01) |
| G06F 16/176 | (2019.01) |
| G06F 40/166 | (2020.01) |
| G06F 16/93 | (2019.01) |
| G06F 16/172 | (2019.01) |
| G06F 16/17 | (2019.01) |
| G06F 16/25 | (2019.01) |

(52) U.S. Cl.
CPC .......... *G06F 9/451* (2018.02); *G06F 9/5072* (2013.01); *G06F 9/5077* (2013.01); *G06F 9/54* (2013.01); *G06F 12/0871* (2013.01); *G06F 16/172* (2019.01); *G06F 16/1734* (2019.01); *G06F 16/1774* (2019.01); *G06F 16/252* (2019.01); *G06F 16/901* (2019.01); *G06F 16/93* (2019.01); *G06F 21/31* (2013.01); *G06F 21/53* (2013.01); *G06F 21/563* (2013.01); *G06F 40/166* (2020.01); *H04L 63/10* (2013.01); *H04L 63/20* (2013.01); *H04L 65/4015* (2013.01); *H04L 67/34* (2013.01)

(56) References Cited

U.S. PATENT DOCUMENTS

| | | | |
|---|---|---|---|
| 8,863,297 B2* | 10/2014 | Sharma | H04L 63/0815 726/26 |
| 9,483,259 B1* | 11/2016 | Lee | G06F 8/71 |
| 9,699,034 B2* | 7/2017 | Lee | H04L 67/10 |
| 9,952,856 B2* | 4/2018 | Wetzold | G06F 8/71 |
| 2013/0247004 A1* | 9/2013 | DeLuca | G06F 8/71 717/120 |
| 2014/0033067 A1* | 1/2014 | Pittenger | G06Q 10/101 715/751 |
| 2014/0297516 A1* | 10/2014 | Brown | G06F 9/451 705/39 |
| 2015/0082148 A1* | 3/2015 | Lai | G06F 40/14 715/235 |
| 2015/0112927 A1* | 4/2015 | Lee | G06F 16/178 707/610 |
| 2015/0199318 A1* | 7/2015 | Lemonik | G06Q 10/101 715/255 |
| 2016/0357778 A1* | 12/2016 | MacKenzie | G06F 16/178 |
| 2017/0012870 A1* | 1/2017 | Blair | H04L 45/02 |
| 2017/0064027 A1* | 3/2017 | Grenader | G06F 16/172 |
| 2018/0191832 A1* | 7/2018 | Gero | H04N 21/00 |
| 2019/0354454 A1* | 11/2019 | Shmouely | G06F 21/53 |

OTHER PUBLICATIONS

Doring, "How to Use the Collaborative Web Editor", 2017, Anchor, published at https://secure.efoldering.com/support/Knowledgebase/Article/View/1024/82/anchor---how-to-use-the-collaborative-web-editor (Year: 2017).*

Doring, "Anchor—How to Use the Collaborative Web Editor", 2017, https://secure.efoldering.com/support/Knowledgebase/Article/View/1024/82/anchor---how-to-use-the-collaborative-web-editor (Year: 2017).*

* cited by examiner

SECURITY MODEL FOR LIVE APPLICATIONS IN A CLOUD COLLABORATION PLATFORM

CROSS-REFERENCE TO RELATED APPLICATIONS

This application claims the benefit of U.S. Provisional Patent Application 62/751,074, by Tung, et al., "Integrating Customizable Live Applications Into A Cloud Collaboration Platform," filed Oct. 26, 2018, and U.S. Provisional Patent Application 62/751,058, by Tung, et al., "Embedding Prefabricated Live Applications Into A Cloud Collaboration Platform," filed Oct. 26, 2018, which are hereby incorporated by reference in their entirety.

This application is related to U.S. patent application Ser. No. 16/264,051 titled "Live Apps—Developer Experience," filed herewith, U.S. patent application Ser. No. 16/264,084 titled "Live Apps—Data Model API," filed herewith, U.S. patent application Ser. No. 16/264,077 titled "Live Apps—Offline Capabilities," filed herewith, and U.S. patent application Ser. No. 16/264,058 titled "Live Apps—Rich Text Box," filed herewith, all of which are herein incorporated by reference in their entireties.

BACKGROUND

A cloud collaboration platform may allow users to author various forms of content, for example, text files, spreadsheets, presentation slides, and other documents. The cloud collaboration platform may furnish a litany of word processing tools to authors to create and revise the documents. An author may also communicate with other users on the cloud collaboration platform, share documents, and receive comments, suggestions, edits, and other feedback. By integrating communication tools with word processor tools, a cloud collaboration platform may enhance workflows, save time, and promote teamwork and user satisfaction.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
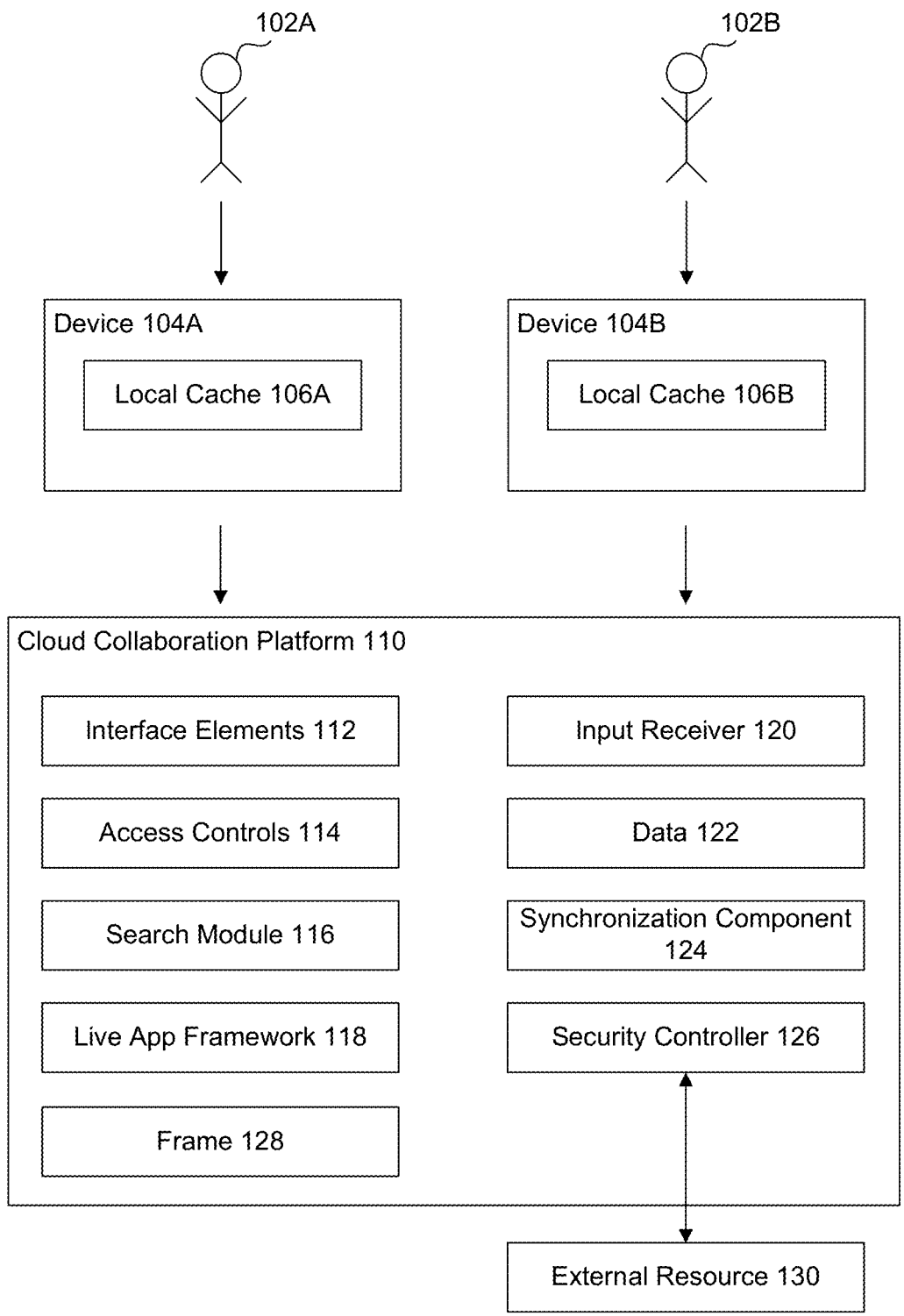
FIG. 1 is a schematic block diagram showing an example environment including a cloud collaboration platform, according to some embodiments.

Provided herein are system, apparatus, device, method and/or computer program product embodiments, and/or combinations and sub-combinations thereof, for providing a security model to customizable live applications in a cloud collaboration platform.

A cloud collaboration platform may allow multiple users to work together to design, write, implement, edit, and finalize various forms of content. Such content may be text files, spreadsheets, presentation slides, videos, audio files, and other suitable documents. A cloud collaboration platform may include word processing tools that allow users to create, compose, draft, and revise these documents. A cloud collaboration platform may include a versioning system to dynamically track changes made to documents over time.

A cloud collaboration platform may encourage collaboration among users by allowing users to send other users messages, include comments in or on documents, post to message boards, solicit feedback, and engage in other suitable communications. Some comments in a cloud collaboration platform may be viewable by all users while other comments may be user-specific and only viewable by one user or a subset of the users. Comments may tag, link, @mention, or otherwise reference other users, documents, and materials. Users may also post feedback stickers, i.e., prompts via which users can receive information from other users, conduct polls, receive text answers to questions, etc.

A cloud collaboration platform may incorporate permissions, configurations, and access controls. For example, a cloud collaboration platform may allow users to set access permissions to documents. In an embodiment, a document's author may control whether other users may edit or view the document, comment on the document, share the document, delete the document, etc. An author may set access permissions on a per-user, i.e., grant access to only one user or a subset of users, and/or a per-document basis, i.e., configure a different set of access permissions for each file in the cloud collaboration platform.

A cloud collaboration platform may be enhanced by supporting interactive, embeddable, customizable software applications, herein referred to as live applications, within the cloud collaboration platform. A user may insert live applications into a document to access any programmed behaviors. Live applications may be inlayed in the documents in the cloud collaboration platform using an inline frame, section, or other HTML construct.

A live application may be a first-party application developed by and provisioned within the cloud collaboration platform as a standardized and readily deployable live application. Examples of first-party live applications may include: project trackers, calendars, Kanban boards, checklists, countdowns, and polls. A user may insert a first-party live application within documents in the cloud collaboration platform to easily access the preconfigured functionalities furnished by the cloud collaboration platform. Organizations may configure which first-party live applications may be embedded in documents.

However, a live application may also be developed by a third party, i.e., by the organization, to further customize and extend the canvas of the cloud collaboration platform to meet unique requirements and organizational needs. In developing, deploying, and maintaining a third-party live application, an organization may leverage an extensible application program interface (API), a data model, development framework, and security model provided by the cloud collaboration platform. Thus, developers may design, write, customize, and maintain live applications to address unique use cases, and the cloud collaboration platform may provide the tools to safely, securely, and promptly deploy the third-party live applications.

In an embodiment, a third-party live application may be a sandboxed live application or a non-sandboxed live application. A non-sandboxed live application may interface and connect with external tools and data sources, e.g., data lakes, data repositories, databases, other cloud systems, application servers, etc. A sandboxed live application may be a live application that does not connect to external systems and, thus, may face more stringent security requirements. A cloud collaboration platform may vet, audit, and/or perform other suitable quality control measures upon both types of live applications to ensure adherence with system requirements before the live applications may be deployed into the cloud collaboration platform.

However, integrating third-party live applications into a cloud collaboration platform mandates that the cloud collaboration platform address a panoply of security concerns. For example, the data presented to live applications may need to be narrowly tailored and controlled to avoid data breaches and inappropriate access. Providing secure means of connecting live applications to offsite data systems, in the case of non-sandboxed live applications, also presents significant technological hurdles. Legacy solutions have proven incapable of providing developer-friendly solutions.

Accordingly, a need exists to provide a security model to customizable live applications in a cloud collaboration platform.

FIG. 1 is a schematic block diagram showing an example environment 100 including a cloud collaboration platform, according to some embodiments. Environment 100 may include users 102, such as users 102A and 102B, devices 104, such as devices 104A and 104B, local caches 106, such as local caches 106A and 106B, and cloud collaboration platform 110.

Users 102 may be individuals or entities developing documents on a cloud collaboration platform. Users 102 may members of a business, organization, or other suitable group using the cloud collaboration platform to perform tasks related to that business or organization. Or users 102 may be individuals using a cloud collaboration platform for personal pursuits. Users 102 may be human beings, but users 102 may also be artificial intelligence constructs. Users 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Devices 104 may be personal digital assistants, desktop workstations, laptops or notebook computers, netbooks, tablets, smart phones, mobile phones, smart watches or other wearables, appliances, part of the Internet-of-Things, and/or embedded systems, to name a few non-limiting examples, or any combination thereof. Although devices 104 are illustrated in the example of FIG. 1 as a single computer, one skilled in the art(s) will understand that devices 104 may represent two or more computers in communication with one another. Therefore, it will also be appreciated that any two or more components of environment 100 may similarly be executed using some or all of the two or more computers in communication with one another.

Local caches 106, such as local cache 106A and local cache 106B, may be hardware caches, software caches, or some combination thereof, storing a wide-array of data on devices 104. Local caches 106 may facilitate an offline mode for cloud collaboration platforms, so document editing, message sending, and user commenting may continue to function on devices 104 in the absence of Internet connectivity. Moreover, local caches 106 may reduce costly interactions between a cloud collaboration platform and devices 106 and improve the efficiency of document editing and the performance of live applications. Local caches 106 may be a memory in proximity to CPU's located in devices 104. Local caches 106 may include more than one different independent caches in a hierarchy of cache levels, or local caches 106 may divide, subdivide, or organize caches into further subcaches or levels.

Cloud collaboration platform 110 may combine word processing tools with communication tools to enhance teamwork and collaboration among multiple users in building, editing, and finalizing text files, documents, spreadsheets, presentation slides, and other files. Cloud collaboration platform 110 may include interface elements 112, access controls 114, search module 116, live application framework 118, input receiver 120, data 122, and synchronization component 124.

Cloud collaboration platform 110 may provide organizations with the capability to develop customized, third-party live applications and integrate the live applications into cloud collaboration platform 110. Cloud collaboration platform 110 may provision an extensible application program interface (API), a data model, and development framework to the third parties to allow developers for the third party to design, write, customize, and maintain the live applications. A data model may specify the appropriate format for requesting and modifying data used by the live applications.

Interface elements 112 may provide components that allow cloud collaboration platform 110 to render a user interface for users 102 to view on devices 104. Interface elements 112 may include a JavaScript library or other user interface library to facilitate dynamic interactions between users 102 and cloud collaboration platform 110. Interface elements 112 may include a development toolkit facilitating the building and deployment of HTML5 applications or mobile applications. Interface elements 112 may include appropriate stylesheets and design formats to shape, for example, the display format of data retrieved by cloud collaboration platform 110.

Access controls 114 may control permissions and user access within cloud collaboration platform 110. Access controls 114 may authorize connections to cloud collaboration platform 110 using username/password combinations. In some embodiments, access controls 114 may employ an alternate authentication methodology, such as two-factor authentication, token authentication, biometric data, etc., to identify, authorize, encrypt, and account for user connections. The level of access granted to a user may vary depending on the user type; therefore, the functionality provided to users may differ depending on the individual user accessing the system. Access controls 114 may additionally track access to documents among users 102. For example, access controls 114 may store information indicating that a particular user may access a particular document and an access level. Access controls 114 may further store information about external data sources, for example, OAuth or SAML parameters to be used when interacting with external data systems.

Search module 116 may allow users 102 to search for other users, documents, files, or data items within cloud collaboration platform 110. Search module 116 may employ a suitable search tool or indicator to receive an input from users 102. Search module 116 may use an appropriate cataloging methodology to store previous messages, comments, edits, etc. and retrieve appropriate information via full-text searches. Search module 116 may promote the use of "@" or "#" to retrieve appropriate documents, users, or live applications that satisfy the searches from users 102. In an embodiment, search module 116 may retrieve live applications by a configured name. For example, users 102 may insert a live application named "My Tasklist" into a document by entering "@My Tasklist." In an embodiment, search module 116 may retrieve a list of applications satisfying an entered substring, i.e., in the above example search module 116 may display the "My Tasklist" live application when users 102 enter "My T" or other suitable substring.

Live application framework 118 may allow an organization to develop customizable live applications, to integrate the applications into cloud collaboration platform 110, and embed the applications in documents. Live application framework 118 may employ a data API through which developers with organizations may interact with data used by the live application and stored within cloud collaboration platform 110. Live application framework 118 may use a data model that conceptualizes the layout of data for records stored in the system. Live application framework 118 may support the extension of standard functionalities and interface components, i.e., building blocks, within cloud collaboration platform 110, for example, comments, mentions, and references. Live application framework 118 may allow customized live applications to function while in offline mode. Live application framework 118 may further provide a versioning system to allow developers to specify which APIs their live application should run against, to avoid breaking the behavior of deployed customizable live applications with the release of subsequent updates to live application framework 118. Live application framework 118 may support the bundling of live applications into packages to organize the deployment of applications. Live application framework 118 may analyze customized live applications to ensure that the applications adhere to security requirements or provide a means by which an organization may verify that the developed application adhere to and meet security requirements. Live application framework 118 is described in further detail below with reference to FIG. 2.

Input receiver 120 may receive and process inputs from users 102 within cloud collaboration platform 110. Input receiver 120 may receive inputs from any suitable mechanism including: a mouse, a keyboard, stylus, input gesture, or other suitable mechanism for expressing a user intentions. Input receiver 120 may receive the inputs from users 102 via devices 104. User inputs may include entering text, drawing checkmarks, circles, squares, lines, and other geographic symbols, swiping, clicking, tapping, dragging, and other gestures. Input receiver may use interface elements 112 to display appropriate navigational buttons, input forms, and other HTML fields to facilitate interaction with cloud collaboration platform 110.

Data 122 may be a variety of stored information relevant to the documents, messages, comments, live applications, and other information in cloud collaboration platform 110. Data 122 may be housed or stored in a relational database, a NoSQL database or other horizontally scaling database, a digital ledger technology or blockchain, or any other suitable storage mechanism. For instance, cloud collaboration platform 110 may harness any commercially available database management system to store and retrieve data 122. In an embodiment, data 122 may be stored in a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. In an embodiment, cloud collaboration platform 110 deploys a hard-disk interface, such as ATA, SATA, SCSI, SAS, and/or fibre for interfacing with storage mediums housing data 122.

Synchronization component 124 may be employed by cloud collaboration platform 110 to process changes made by a user, e.g., user 102A, and ensure that the changes are reconciled with changes made by other users, e.g., user 102B. Synchronization component 124 may receive a change from a device, e.g., device 104A, and determine a record related to the change. The change may reflect modifications to the record in a document or a live application embedded in a document. The record may include a sequence number and a record type, with the sequence number reflecting an order in which changes are made, i.e., a record version number and the record type indicating the data type associated with the record, e.g., a rich text field, an image, a binary file, Boolean, string, number, etc.

Synchronization component 124 may employ a merging algorithm to process changes made to a document or live application. In some cases, synchronization component 124 may determine that a conflict arises when applying the changes, e.g., where a second change was received from a different user that modified the same record in a different fashion. In such an instance, synchronization component 124 may employ a combination of suitable algorithmic approaches to resolve potential conflicts. Synchronization component 124 may determine based on the record type whether both changes may be applied without data interference. For example, if the record type is a record list and the received changes impacted disparate records in the record list, then the changes may be applied without one change interfering with the second change. In another example, the record type may be a rich text field, and synchronization component 124 may analyze the first change and the second change and determine that different paragraphs in the rich text field were modified by the users. In this instance, the separate paragraphs may be modified without one change being lost. In some cases, the conflicts may not be merged and the sequence number may control which change gets applied. For example, if user 102B modified a "color" property of a record and user 102A later modified the same "color" property of the same record, the changes would need to be resolved based on the sequence number; in this case, user 102B's change may apply.

Synchronization component 124 may receive the changes, resolve the conflicts, and determine a final state for the record based on a series of applied changes and resolved conflicts. Synchronization component and/or live application framework 118 may then store the final state of the record in data 122. This version of the record may be referred to herein as the server-side record. After storing the final state of the record in the server-side data storage, synchronization component 124 may return the final state to devices 104 to apply the final state to local caches 106, thereby incorporating any changes received from other users. In some embodiments, synchronization component 124 may interface with devices 104 continuously so that devices 104 may receive changes from other users 102 in real-time or near-real time.

Security controller 126 may provide a security model for live applications in cloud collaboration platform 110. Security controller 126 may process information from frames 128 running a third-party live application. In an embodiment, a third-party live application may be a sandboxed live application (a live application that connects to external data sources) or a non-sandboxed live application (an application that does not connect to external data sources). Security controller 126 may vet, audit, or perform other suitable quality control upon both types of live applications to ensure adherence with security requirements and protocols. Security controller 126 may impose additional restrictions upon sandboxed live applications to ensure proper data management and security compliance. Security controller 126 may prevent the frame from accessing context and data in the frames of other live applications.

Security controller 126 may ensure that appropriate data is provided to a live application in a controlled manner along with a tailored set of functionalities. For example, security controller 126 may provide a set of data needed to perform an auto-complete function. In such an example, users 102 may enter the mention character of, for example, "@." Security controller 126 may take over rendering of the auto-completion from the child frame via the parent frame and auto-complete the available accounts in the system within the live application's parent frame. Thus, the user of the live application may select an appropriate account to auto-complete the mention without actually exposing account information to the live application, and the auto-complete option selected by the user does not get sent to the child frame. Security controller 126 may apply a content-security policy to the frame, described in further detail below with reference to FIG. 2.

Security controller 126 may also associate a live application with a subdomain based upon a type and/or identifier of the live application. Security controller 126 may then ensure that the web browser is served the frame running the live application from a different domain than the document running the live application while incorporating the subdomain in the different domain. For example, a subdomain may exist for all live applications of type "poll," for instance, poll.website.com, and this subdomain may be used by security controller 126 to serve the content to those live applications. In another embodiment, subdomains may be configured for each live application identifier, e.g., ID.website.com. The foregoing example assumes that the document editor is provided by website.com. Moreover, live applications may be generally served by cloud collaboration platform 110 from a distinct domain as compared to the domain serving the documents. By serving the live application from a different domain, security controller 126 may provide different and more stringent security requirements upon the live application. Furthermore, security controller 126 may narrowly tailor the data set available to the live application because any record accessed by the live application must be accessed through an exposed API or data model rather than in the DOM.

Security controller 126 may apply a sandbox attribute in the frame running the live application. A sandbox attribute may enable an extra set of restrictions on content and behavior (e.g., whether popups are allowed) in frames 128. The sandbox attribute may treat content therein as being from a unique origin, block form submission and script execution, prevent links and plugins, and curtail a myriad of other behaviors or all of or a subset of the foregoing. For example, security controller 126 may prevent the stealing of focus by the live application without user action to maintain a consistent user experience within the cloud collaboration platform.

Security controller 126 may perform litany of other security-related behaviors as well and ensure that the third-party does not interfere with users' experiences on cloud collaboration platform 110. For example, security controller 126 may identify live applications that are stuck in an infinite loop or otherwise overly consuming system resources and kill the live application process or disable the frame. Security controller 126 may monitor the runtime behavior of a live application using any suitable approach.

Frames 128 may be used to embed one HTML document within another HTML document to be read by web browsers or other tools running on devices 104. Each frame among frames 128 may include a unique browsing context in which content may reside. Frames 128 may include various attributes, e.g., height, width, border, etc. and these attributes may vary based upon the manner of use of the frame within cloud collaboration platform 110. One such attribute may be a sandbox attribute used to apply extra restrictions to content in frames 128. Frames 128 may also include a header that specifies a content security policy to provide an added layer of security that detects cross-site scripting and data injection attacks. Content security policies are described in further detail below with reference to FIG. 2. One skilled in the arts will appreciate that a document in cloud collaboration platform 110 may include multiple frames 128. For example, cloud collaboration platform 110 may embed a live application in a child frame, with a parent frame used to render the overall document.

External resource 130 may be external tools and data sources such as tasklists, data lakes, data repositories, databases, other cloud systems, application servers, etc. For example, a third-party live application named "My Tasklist" may be developed that connects to an external resource, e.g., a JIRA repository, to load information about a user's tasklist. The live application may then display information about the developer's tasks in the cloud collaboration platform, receive updates directly in the cloud collaboration platform, and relay the changes to the JIRA repository for synchronization. This example third-party live application will be referenced further in the disclosure below.

Figure 2:
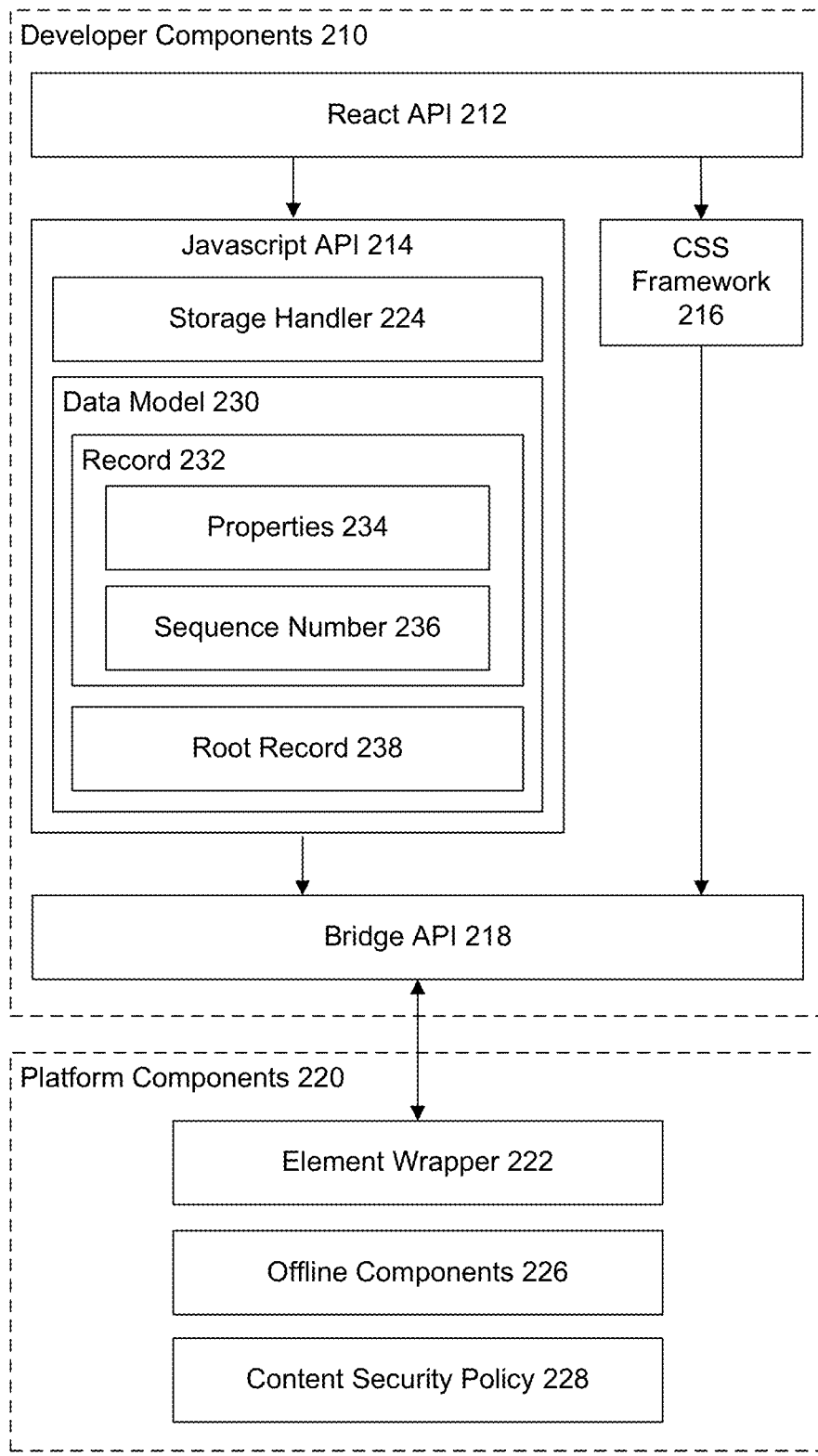
FIG. 2 is a schematic block diagram showing a live application framework, according to some embodiments.

FIG. 2 is a schematic block diagram showing live application architecture 200, according to some embodiments. Live application architecture 200 may support and facilitate the development and deployment of third-party live applications in cloud collaboration platform 110. Live application architecture 200 may include developer components 210 and platform components 220.

Developer components 210 may be accessed by developed to program third-party live applications. Developer components 210 may include react API 212, javascript API 214, CSS framework 216, and bridge API 218.

React API 212 may be code, libraries, HTML, and components employed by cloud collaboration platform 110 to handle common considerations shared across live applications. For example, react API 212 may handle a resizing command received from users 102. React API 212 may receive commands from users 102 related to the creating, saving, and updating of data by a customizable live application. React API 212 may include Javascript API 214 and CSS framework 216 as subcomponents or these components may be independent from react API 212.

Javascript API 214 may facilitate the implementation of common operations performed in the document object model or other suitable programming interface. Javascript API 214 may receive scripting commands and execute triggers associated with the commands within cloud collaboration platform 110. Javascript API 214 may allow developers of third-party live applications to employ functionality that is standard within cloud collaboration platform 110, for example, performing a certain behavior during an on-hover event. In this example, users 102 may see further information about a user in cloud collaboration platform 110 when they hover the mouse over a user image.

CSS framework 216 may be harnessed by react API 212 to maintain a consistent visual style within cloud collaboration platform 110. CSS framework 216 may provide a utilitarian interface including static methods, properties, and specifications. CSS framework 216 may deploy appropriate styles to developers of third-party live applications to allow the live applications to adopt a look-and-feel that matches the general properties of a document in a cloud collaboration platform 110.

Bridge API 218 may coordinate communications between a live application and cloud collaboration platform 110. Bridge API 218 may define a protocol that employs protocol buffer messages or other suitable method of formatting language- and platform-neutral serialized data structures for use in communication protocols. Bridge API 218 may perform requests resultant from modifications made by a live application to the data model and thus, a live application may not call bridge API 218 directly, instead referencing intermediate APIs that call bridge API 218 to perform transactions.

Platform components 220 may include modules, functions, and other code executed on cloud collaboration platform 110 to allow third-party live applications to function. Platform components 220 may include element wrapper 222, storage handler 224, offline components 226, content security policy 228, data model 230, record 232, properties 234, sequence number 236, and root record 238.

Element wrapper 222 may wrap, embed, inlay, etc. a live application within a document for rendering in cloud collaboration platform 110. Element wrapper 222 may process and handle layout and user-interface interactions live applications and documents in cloud collaboration platform 110. A live application may be of a certain type, e.g., a "poll," a "list," etc. A live application may have a unique identifier associated with the live application.

Storage handler 224 may process data initialization, storage, modification, and retrieval requests received from a live application. Storage handler 224 may provide an API to a live application to perform varied tasks against the data model. For example, storage handler 224 may receive an API call such as "getRecordById," "getRootRecord," etc. and retrieve the appropriate set of information from data 122 based on the request. In other words, storage handler 224 may serve as an intermediate API between the data model and the live application. Storage handler 224 may communicate with bridge API 218 to complete storage-based modifications and requests.

Offline components 226 may be interfaces and functions that allow live application architecture 200 to function when Internet connectivity is not available on a device. Offline components 226 may connect to local caches 106 to pull data used by other components in live application architecture 200 when devices 104 are offline or at other appropriate times. Offline components 226 may interface with storage handler 224 to ensure that modifications made by users 102 when the device is offline are recorded and changes relayed to cloud collaboration platform 110 when connectivity returns. Offline components 226 may receive a final state from cloud collaboration platform 110 after changes are applied (or received from other users) and update local caches 106 with the final state reflecting the server-side data storage maintained in data 122.

In an embodiment, offline components 226 may be a separate set of components from, e.g., storage handler 224, that may engage when devices 104 enter an offline state. A live application may read from local caches 106 to retrieve data and render the live application and write to local caches 106 when the live application changes data, i.e., even when devices 104 maintains Internet connectivity. When devices 104, any changes made by a live application may be quickly propagated to cloud collaboration platform 110 for application to the server-side data store, e.g. data 122. When devices 104 are offline and offline components 226 are engaged, changes may persist in local caches 106 until devices 106 return online, connect to cloud collaboration platform 110, and propagate the stored changes, comments, messages, etc.

Content security policy 228 may provide an additional layer of security within platform components 220. Content security policy 228 may allow cloud collaboration platform 110 to leverage a browser on a user's device to enforce access restrictions on the frame in which the live application is running. Content security policy 228 may detect cross-site scripting and injection attacks. Cloud collaboration platform 110 may apply a uniquely tailored content security policy 228 to each frame supporting a live application. For sandboxed live applications, content security policy 228 may be uniformly applied, i.e., in effect against all sandboxed live applications. Content security policy 228 may disallow AJAX calls and other resource requests. Content security policy 228 may disallow particular Javascript or runtime behaviors, for example, clicking links within the live application. In one exemplary embodiment, a header for content security policy 128 for sandboxed applications may resemble:

default-src 'none';
frame-ancestors site.com *.site.com;
connect-src $QUIP_CDN_ORIGIN $CONNECT_SRC_DOMAINS 'self';
font-src $QUIP_CDN_ORIGIN $FONT_SRC_DOMAINS 'self';
img-src $QUIP_CDN_ORIGIN $IMG_SRC_DOMAINS 'self'
site.com *.site.com data: blob;
media-src $QUIP_CDN_ORIGIN $MEDIA_SRC_DOMAINS 'self';
script-src $QUIP_CDN_ORIGIN $SCRIPT_SRC_DOMAINS 'self';
style-src $QUIP_CDN_ORIGIN $STYLE SRC_DOMAINS 'self'unsafe-inline;
[frame-src $FRAME_SRC_DOMAINS]

For non-sandboxed live applications, exceptions may be added on a per-live-application basis to add external locations that the live application may access. In the "My Tasklist" example, an exception may be added to the URL of the JIRA tasklist resource. The "My Tasklist" live application may then the access the external resource due to modified content security policy 228 in place for the live application.

Data model 230 may present a model that allows live applications to request, modify, and store data. For example, a live application may access data stored in cloud collaboration platform 110 in data 122. Cloud collaboration platform 230 may expose data model 230 to store document metadata (e.g., document title, thread members, etc.), document data (e.g., spreadsheet data), data from other live applications embedded in the document, viewer-specific data (e.g., contacts, metadata for other documents that a user may access) user information, and other data related to the functioning of a live application and a document at large. Data model 230 may guarantee appropriate usage of the data API by providing functions and stored variables used by the live application to access and interact with external data.

In one embodiment, when users 102 insert a live application into a document, storage handler 224 may create an empty data field (e.g., a JSON or JSON-like object) and store the field locally within element wrapper 222. One such record initialized by default may be referred to as the root record, described in further detail below as root record 232. A third-party live application may then populate the record in accordance with the data model's requirements to save the data in the record to cloud collaboration platform 110 for further manipulation and later recall. Thus, developers may treat the storage of data into the cloud collaboration platform model the same as storing the data in a JSON object, and the record data needed by a live application may be pulled from data model 230 dynamically at runtime.

Record 232 may provide the basic unit of storage in data model 230. Record 232 may represent a discrete unit of data within an instance of a live application embedded in a document in cloud collaboration platform 110. Record 232 may represent a text field, a rich text box, an image, a blob, a user, or other discrete data units harnessed by a live application. Record 232 may also reference another record or lists of such records enabling developers to design more robust data storage approaches in a hierarchical, tree form.

In an embodiment, record 232 may be one or more key-value pairs, a reference to a second record, or a list of records. Record 232 may be one or more key-value pairs that store information used by the live application. For example, the "My Tasklist" live application may include one or more key-value pairs in root record 238. One such key-value pair may be "title-color," "green" and another key value pair may be "title-text," "My Tasklist." Cloud collaboration platform 110 may then store this information in data 122 via data model 230, retrieve the information at a later time, modify the stored information, etc. When "My Tasklist" loads, the application may load this information and display the title of the live application as "My Tasklist" in the color green. The "My Tasklist" live application may subsequently receive a color update from the user, change the stored key-value pair to "title-color," "red" via an appropriate API call (or direct modification). The next time that this instance of "My Tasklist" loads, the live application instance may retrieve the "title-color", "red" key-value pair and display the "My Tasklist" title in the color red.

Record 232 may also be a second record or a list of records also stored in association with a name field. In the "My tasklist" example, a list of records reflecting the tasks associated with the user may be stored, with each task in turn being its own record object. As described below with reference to FIG. 4, a developer may create and register classes to associate with the records, allowing more advanced functionalities.

Properties 234 allow developers to defined custom properties for records, such as record 232. This ability provides flexibility within data model 230 to store a variety of stock data types as well as developer-defined classes. In one embodiment, properties 234 may provide capabilities to store data types including: a Javascript primitive (string, number, Boolean, etc.), a javascript object or array, a record, or a list of records. Properties 234 may allow developers to make use of additional special data types, for example, a rich text property, an image property, a blob property, a binary file property, etc. In such an embodiment, cloud collaboration platform 110 may forward additional capabilities to the live application via the data model based on the special property.

Sequence number 236 may be included in record 232 to indicate a version of the record. In an embodiment, sequence number 236 may be included in data model 230 as part of record 232 as a timestamp, sequentially arranged identifier number, or other suitable record-versioning construct. For example, if user 102A stores information about a particular record 232 in local cache 106A, the stored record may have sequence number 236 stored in association with the record indicating a version or timestamp. User 102B storing information about the same record 232 in local cache 106B may associate a different sequence number 236 in local cache 106B. Cloud collaboration platform 110 may determine which record version occurred first in time using sequence number 236. Sequence number 236 may then be used to aid in the resolution of conflicts among user edits within a document or live application.

Root record 238 may be a default instance of record 232 created by cloud collaboration platform 110 for each instance of a live application. Root record 238 may include a set of default characteristics that a live application may use to store and retrieve data. Root record 238 may serve as the source record for a hierarchical structure, wherein all sub-records, i.e. one or more records such as record 232, derive from root record 238 in a tree-like structure.

Figure 3A:
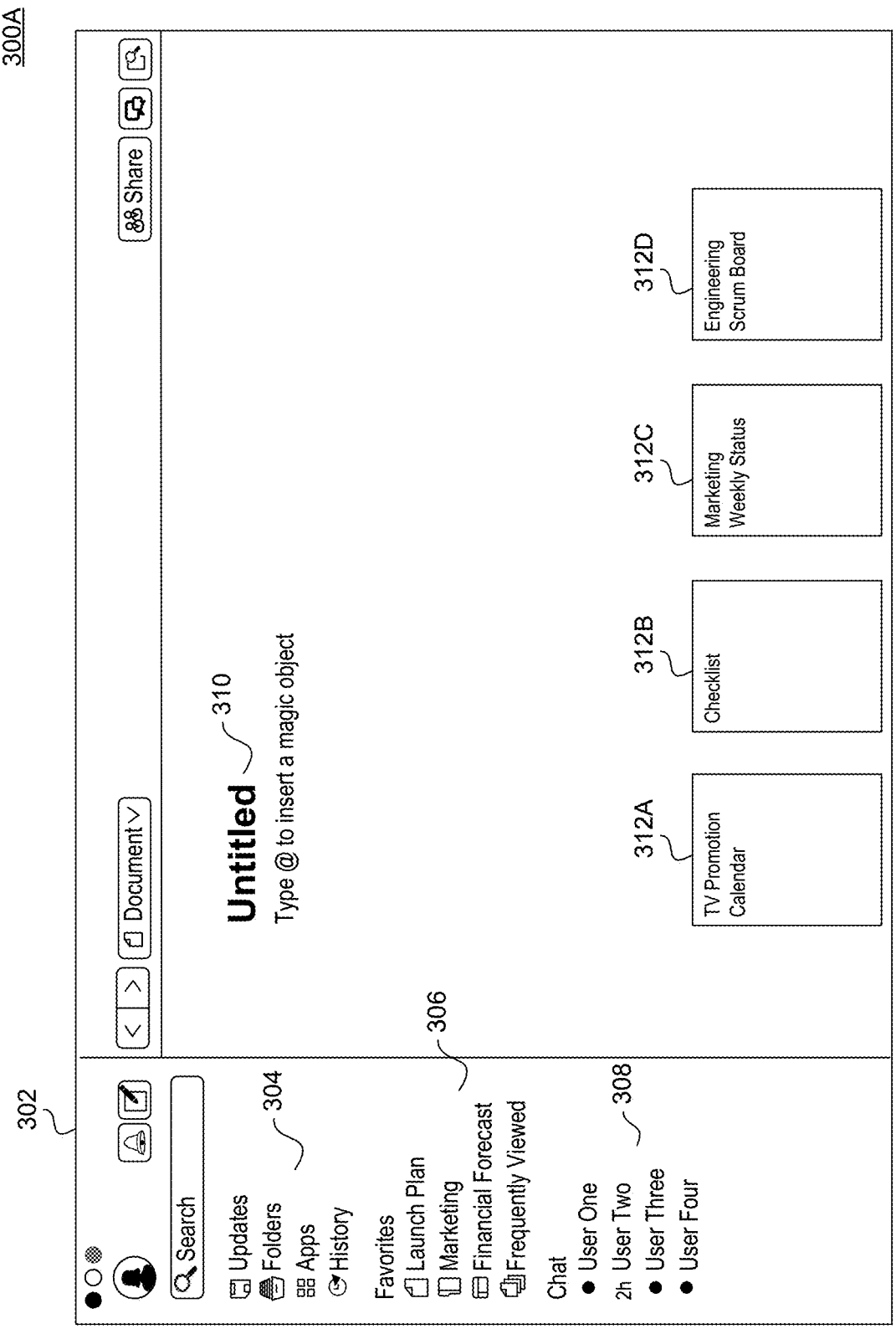
FIG. 3A is an example screen display of a document incorporating live applications in a cloud collaboration platform, according to some embodiments.

FIG. 3A is an example screen display 300A of a document incorporating live applications in a cloud collaboration platform, according to some embodiments. The screen display provided in FIG. 3A is merely exemplary, and one skilled in the relevant art(s) will appreciate that many approaches may be taken to provide a suitable screen display 300A in accordance with this disclosure.

Document 302 may be a document created and stored in cloud collaboration platform 110 and presented to users 102 viewing devices 104. Document 302 may be a word processing document, text file, spreadsheet, presentation slide, video or audio file, or other editable, sharable content. Document 302 may include text, language, images, videos, and other standard HTML components. Document 302 may further include live applications embedded or inserted within the body of the document to provide additional functionality. A set of building blocks may be made available in document 302, as extended and provisioned by cloud collaboration platform 110 to live applications. In an embodiment, cloud collaboration platform 110 may inlay live applications built with third-party code inside inline frames in document 302. In this embodiment, cloud collaboration platform 110 may set global attributes and event attributes in the inline frames.

Navigation panel 304 may provide users 102 with components to navigate cloud collaboration platform 110 and documents therein. In the merely exemplary embodiment portrayed in screen display 300, users 102 may click "Updates" to see a list of recent updates to documents that the user may access, "Folders" to navigate to a list of folders created by the user to store, organize, and share their documents, "Apps" to view a list of live applications to which the user may access or embed, and "History." These examples are in no way exhaustive, however, and navigation panel 304 may include other suitable navigational components or navigate to different areas of cloud collaboration platform 110.

Favorites 306 may display documents, live applications, and other content determined by cloud collaboration platform 110 to be relevant to the viewer. Cloud collaboration platform 110 may determine the content to display in favorites 306 through a suitable methodology, for example, by displaying the most recently accessed documents/resources or the most frequently accessed documents/resources. In another example, cloud collaboration platform 110 may receive a configured selection from users 102 and consider the configurations in determining the content to display in favorites 306. Favorites 306 may receive user inputs and navigate to an appropriate document or other location based on the received user inputs.

Chat 308 may provide a conversation mechanism by which a user may communicate with other users. In an embodiment, selecting a user in chat 308 may open a chat window in which the user may send a message to the selected user. The chat window may support mentions, comments, links to documents, and other core functionalities.

Prompt 310 may provide a space in which users 102 may build a document and edit the content included therein. Users 102 may enter text, images, tables, etc. In one embodiment, by entering a token, for example "@", the user may load a menu of additional content that may be embedded in the document. Such additional content may include links to other documents, mentions of other users, and live applications. For example, users 102 may click in 310 and type "My Tasklist" (the above exemplary third-party live application). Upon confirming, cloud collaboration platform 110 may insert the "My Tasklist" application into the document. The "My Tasklist" application may load data from data model 230 in the form of one or more records, i.e., record 232, and render the "My Tasklist" live application based on the retrieved data.

Selector 312 may provide an additional mechanism by which users 102 may enter live applications into document 302. Selector 312 may display the live applications configured and deployed by an organization. Selector 312 may also display live applications that are preconfigured by cloud collaboration platform 110 to display. Selector 312 may further allow a user to configure the displaying live applications, for example, by removing a live application or adding an additional live application.

Figure 3B:
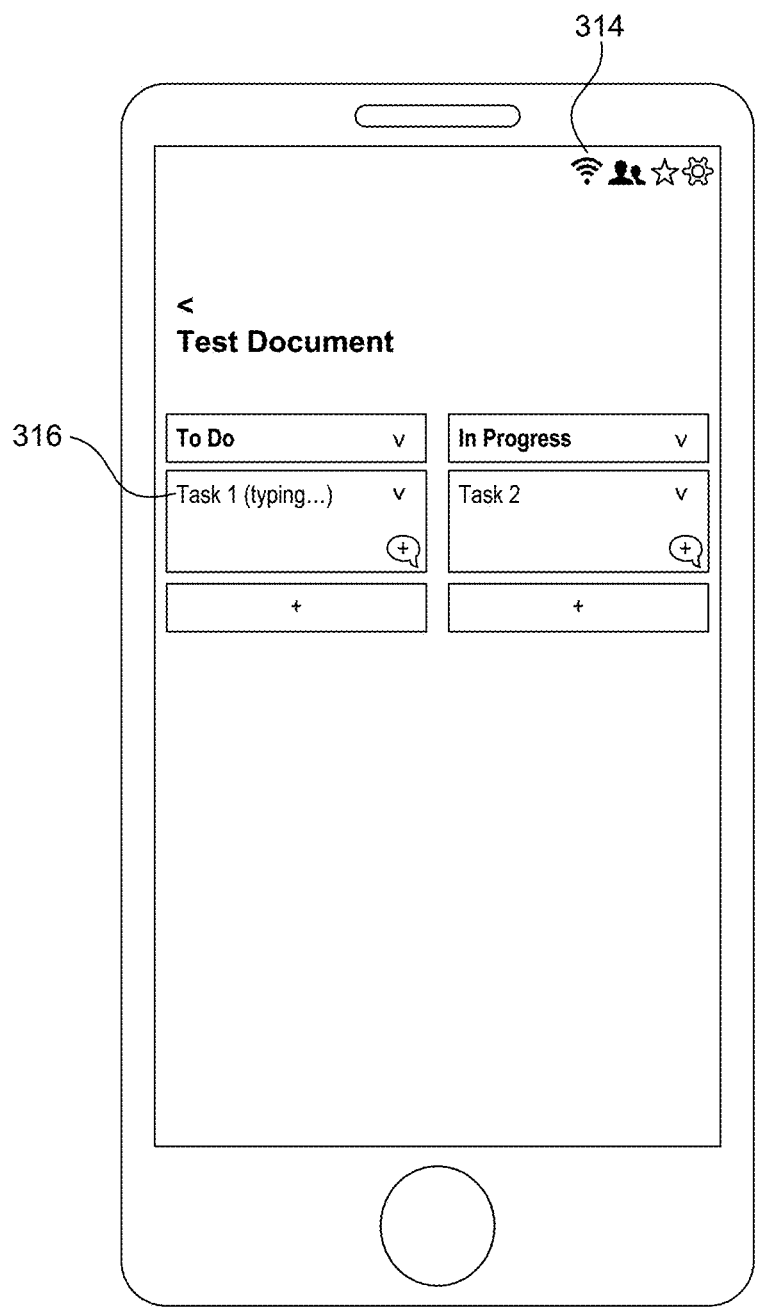
FIG. 3B is an example screen display of a document incorporating live applications in a cloud collaboration platform as displayed on a mobile device, according to some embodiments.

FIG. 3B is an example screen display 300B of a document incorporating live applications in a cloud collaboration platform as displayed on a mobile device, according to some embodiments. The screen display provided in FIG. 3B is merely exemplary, and one skilled in the relevant art(s) will appreciate that many approaches may be taken to provide a suitable screen display 300B in accordance with this disclosure.

Connectivity status 314 may provide an indication as to whether devices 104 can or cannot connect to cloud collaboration platform 110. In an embodiment, connectivity status 314 may display a wireless-connectivity logo or other suitable image when connectivity is available. In an embodiment, the image may be crossed out, not display, or otherwise indicate that Internet connectivity is unavailable. When connectivity status 314 indicates a lack of connection between devices 104 and cloud collaboration platform 110, the device may be considered to be in an offline mode. When in an offline mode, documents and live applications in cloud collaboration platform 110 may continue to function, i.e., be viewed, edited, engaged, etc. with changes being relayed to cloud collaboration platform 110 by offline components 226 via synchronization component 124 upon a return of connectivity.

Lock indicator 316 may demonstrate to user 102A that another user, e.g. user 102B is presently modifying that record. In an embodiment, lock indicator 316 may display as a lock image, a representation of a user account (reflecting the user locking a record), or other suitable image. In the exemplary embodiment provided in FIG. 3B, user 102B may be editing the record in the "To Do" column, thus locking the record from the viewing user (here, user 102A). User 102A may edit the "In Progress" column. Once user 102B relinquishes the lock, user 102A may edit the "To Do" column.

Figure 4:
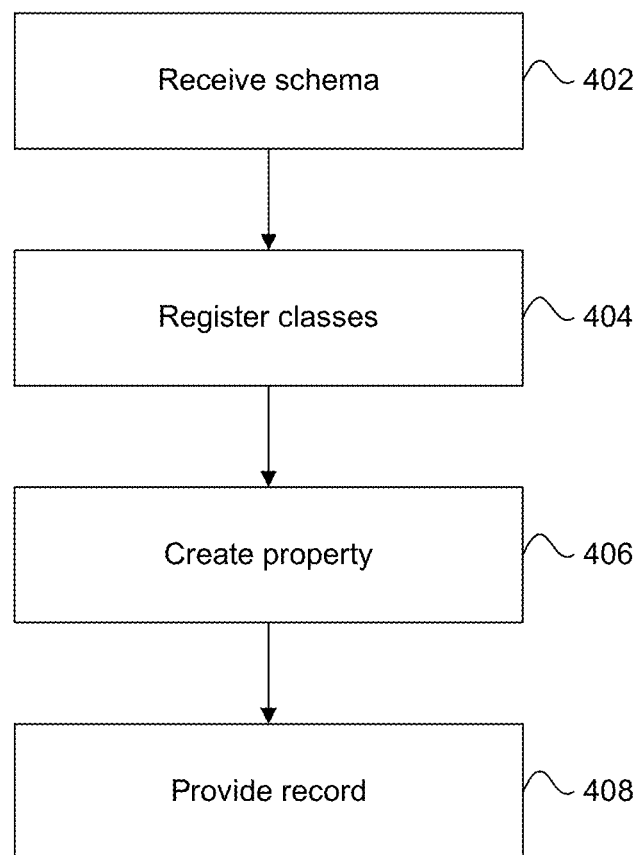
FIG. 4 is a flowchart illustrating a method of processing data requests from a live application in a cloud collaboration platform, according to some embodiments.

FIG. 4 is a flowchart illustrating a method 400 of processing data requests from a live application in a cloud collaboration platform, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, cloud collaboration platform 110 may employ storage handler 224 to receive schema, specifications, or other definitions. Cloud collaboration platform 110 may register a record, such as record 232, based on the received data schema. In an embodiment, a schema may define the record name and the record type. In an embodiment, the type may be a simple data type, i.e. a primitive, such as string, Boolean, object, array, etc. Or the type may be a special type such as a constructor, rich text entity, image entity, a record, or a record list. Or the type may be a custom defined type. An example of such a received schema may be:

```
ExampleSchema: {
    "header": CardEntity,
    "color": "string"
}
```

In an example, storage handler 226 may receive the schema and a record to include the properties exhibited by the received schema.

In 404, cloud collaboration platform 110 may register classes defined in the schema received in 402. Cloud collaboration platform 110 may serialize properties in the classes into a JSON field. By registering these classes in accordance with the received schema, cloud collaboration platform 110 may provide further detail, e.g., the data stored in the records, about the registered data entity in subsequent calls. In one embodiment, registered-class information may be provided when a call to "getRootRecord( )" or "getRecord( )" is received from a live application.

In 406, cloud collaboration platform 110 may insert a live application in a document, such as document 302 while including the classes registered in 404 in the created inline frame. Cloud collaboration platform 110 may employ an initialization routine or other appropriate method to create the properties for records included in the live application. The created properties, i.e., properties 234, may be a javascript primitive (string, number, Boolean, etc.), or a link to another record or a list of records. In one embodiment, the property may specify a special class of data type provided by cloud collaboration platform 110, for example a binary data type or blob data type. A record with such a data type may provide additional characteristics for unique handling by cloud collaboration platform 110. One skilled in the relevant arts will understand that this data model allows developers to build a tree-like, hierarchical structure via the data model that represents a panoply of data scenarios and allows the user to store more complicated data usage scenarios via data model 230. For example, cloud collaboration platform 110 may receive a call from a customizable live application to "rootRecord.set(param1, param2)". In this embodiment, "param1" may be the name of the property, and "param2" may be an object containing child properties to set on the newly created record. If no special properties or child properties are to be set, then "param2" may be a null or empty object. Cloud collaboration platform 110 may create the property when the live application is created, and cloud collaboration platform 110 may not need to recreate the object during subsequent loads of the document.

In 408, cloud collaboration platform 110 may provide the record to the live application upon request. In one embodiment, a live application may call "rootRecord.get(param1)" to access the stored entity. A live application may call appropriate modifying functions to update, edit, and add to records stored via the inline frame.

Figure 5:
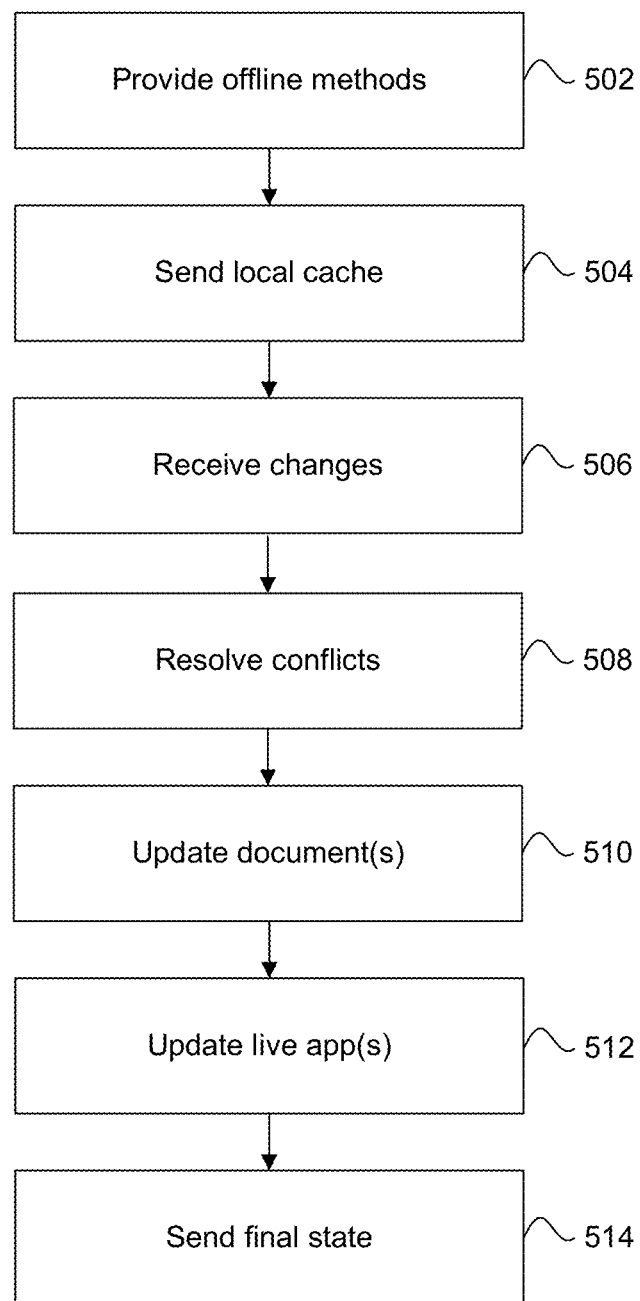
FIG. 5 is a flowchart illustrating a method of providing an offline framework to live applications embedded in documents to function while offline, according to some embodiments.

FIG. 5 is a flowchart illustrating a method 500 of providing an offline framework to live applications embedded in documents allowing the live applications to function while offline, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, cloud collaboration platform 110 may send modules, executables, applications, and other components to support an offline mode to devices 104 when users 102 install tools needed to connect to cloud collaboration platform 110 or at another suitable time. In offline mode, cloud collaboration platform 110 may continue to offer customary functionalities despite the fact that devices 104 may not be able to access cloud collaboration platform 110, for example, due to a lack of network connectivity. In an offline mode, users 102 may continue to make and affect changes to their documents in cloud collaboration platform 110 because devices 104 store a local cache of data to retrieve needed data from and temporarily store modifications. When users 102 make changes to the offline document, devices 104 may store the changes in local caches 106. Notably, the APIs that a live-application developer may use to interface with data store 230 may remain the same regardless of whether devices 104 are online or offline. When devices 104 are offline, retrieved data may reflect the data at a last download time, i.e., the last time devices 104 connected to cloud collaboration platform 110. When devices 104 are online, retrieved data may be more up-to-date with respect to other users' changes. For example, user 102A may change the completed date for a task displayed in the "My Tasklist" live application while device 104A is offline, local cache 106A may store this completed date.

In 504, devices 104 may return to online mode, and devices 104 may transmit the changes stored in local caches that occurred while devices 104 was offline to cloud collaboration platform 110 to synchronize the changes with the online version. In another embodiment, the changes may be sent continuously, i.e., regardless of whether devices 104 lose connectivity, changes are made locally and stored in local caches 106 and sent to cloud collaboration platform 110 for reconciliation periodically. In such an embodiment, devices 104 may wake-up periodically, for example, every 30 seconds, to send recent changes to cloud collaboration platform 110 to reconcile local changes with the server-side data storage and receive any changes made by other users for storage in the local cache.

In 506, cloud collaboration platform 110 may receive changes from devices 104. Cloud collaboration platform 110 may receive the changes in any suitable format, for example, in JSON or other data interchange format, as transaction logs, as executable code, or using any other suitable manner. Cloud collaboration platform 110 may store changes in data 122, in memory, or in a local cache for processing. As part of processing the changes received, cloud collaboration platform 110 may determine if conflicts exist in the changes. As part of making this determination, cloud collaboration platform 110 may receive a record that includes a record type and a sequence number along with the change.

In 508, cloud collaboration platform 110 may determine that conflicts are created by the changes received in 506 and resolve the conflicts. Cloud collaboration platform 110 may determine that no conflicts exist and apply the change to the record to determine the final state. Where conflicts do arise, cloud collaboration platform 110 may use the record type and the natures of the change and the second change to determine if the change and the second change may be applied without conflict, e.g., where the changes impact different portions of the record. Cloud collaboration platform 110 may determine that a conflict exists and use the sequence number to determine between the changes to affect upon the record in determining the final state. The final state, i.e., the status of the record after all changes are applied, may be determined by cloud collaboration platform 110 once all changes are received and reconciled.

In 510, cloud collaboration platform 110 may update the record in a document in the platform based on the final state of the record determined in 508. In an embodiment, cloud collaboration platform 110 may apply the changes into the document if another user is editing the document at the same time. In an embodiment, if multiple edits occur to the offline-edited section, cloud collaboration platform 110 may apply both edits to the document sequentially, i.e., both edited versions may display, one after the other. In an embodiment, cloud collaboration platform 110 may use the sequence number to determine the order in which to apply changes.

In 512, cloud collaboration platform 110 may update live applications as indicated in the changes received in 504. In an embodiment, cloud collaboration platform 110 may apply the change to the live application even if another user is editing the document at the same time. For example, user 102A may add a task to the "To Do" column in a live application (as described above with reference to FIG. 3B). When device 102A returns to online mode, cloud collaboration platform 110 may add the new task to the server-side version of the document so that other users, e.g., user 102B, working on cloud collaboration platform 110 may view and further edit the task. For example, a third party application may display a calendar in a document while offline. A user may add an entry to the calendar while offline. Upon returning to online mode, cloud collaboration platform 110 may synchronize the offline calendar and the online calendar by adding the added calendar entry to the online version of the calendar. One skilled in the relevant art(s) will appreciate that given the wide-ranging behavior of live applications, a number of functions and behaviors may depend on the records being updated.

In 514, cloud collaboration platform 110 may send the final state of the record to devices 104 for application in local caches 106. Because a second change, or multiple changes, may have been applied by cloud collaboration platform 110 in conducting the conflict resolution in 508, local caches 106 may be updated by cloud collaboration platform to reflect the change. Thus, local caches 106 may be kept in synchronization, or near-synchronization, with the server-side copy of records stored in data 122.

Figure 6:
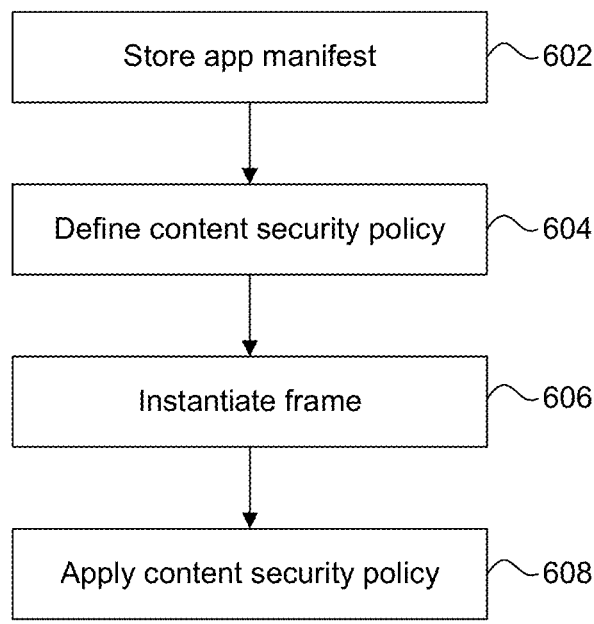
FIG. 6 is an example screen display of enforcing security policies in live applications embedded in a cloud collaboration platform, according to some embodiments.

FIG. 6 is a flowchart illustrating a method 600 of enforcing security policies embedded in a live applications embedded in a cloud collaboration platform, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 602, cloud collaboration platform 110 may store the application manifest for a live application. An application manifest may describe bindings and provide an name, icon, author, and description for the live application. In an embodiment, the application manifest may be a JSON file describing the live application and specifying configuration information about the live application. An example application manifest file may be:

```
{
    "id": "JYKAjAYyzLM",
    "name": "Poll",
    "toolbar_color": "blue",
    "js_files": ["dist/app.js"],
    "css_files": ["dist/app.css"],
    ...
}
```

In 604, cloud collaboration platform 110 may specify, identify, and define content security policy 228 for the live application. Content security policy 228 may include appropriate header information and prevent cross-site scripting and other invasive forms of malicious content. Content security policy 228 may define script access, font sources, images sources, and connection sources to limit the locations from which a customizable live application may download or execute scripts and other web content. Live applications may whitelist URLs for other resources to apply AJAX calls to access external domains within content security policy 228. Cloud collaboration platform 110 may apply a uniquely tailored content security policy 228 to each frame housing a live application. For sandboxed live applications, the applied content security policy may be uniformly applied. Content security policy 228 may disallow AJAX calls and other resource requests. For non-sandboxed live applications, exceptions may be added on a per-live-application basis to add external locations that the live application may access.

In 606, cloud collaboration platform 110 may instantiate frames 128 in which to run the live application related to the application manifest stored in 602. Cloud collaboration platform 110 may instantiate the frame using a subdomain based upon the type or identifier of the live application. Security controller 126 may ensure that frames 128 runs the application from a different domain than the parent document. Cloud collaboration platform 110 may serve the live application from a different domain, wherein the subdomain is included in the different domain.

In 608, cloud collaboration platform 110 may apply content security policy 228 in response to a request to insert a live application in a document. When applying content security policy 228, cloud collaboration platform 110 may serve the URL from a separate domain to sandbox the code contained in the customizable live application from the document. The application of content security policy 228 to a URL on a separate domain further protects against attempts by a customizable live application to impersonate first-party code by making server calls and engaging in other malfeasance.

Figure 7:
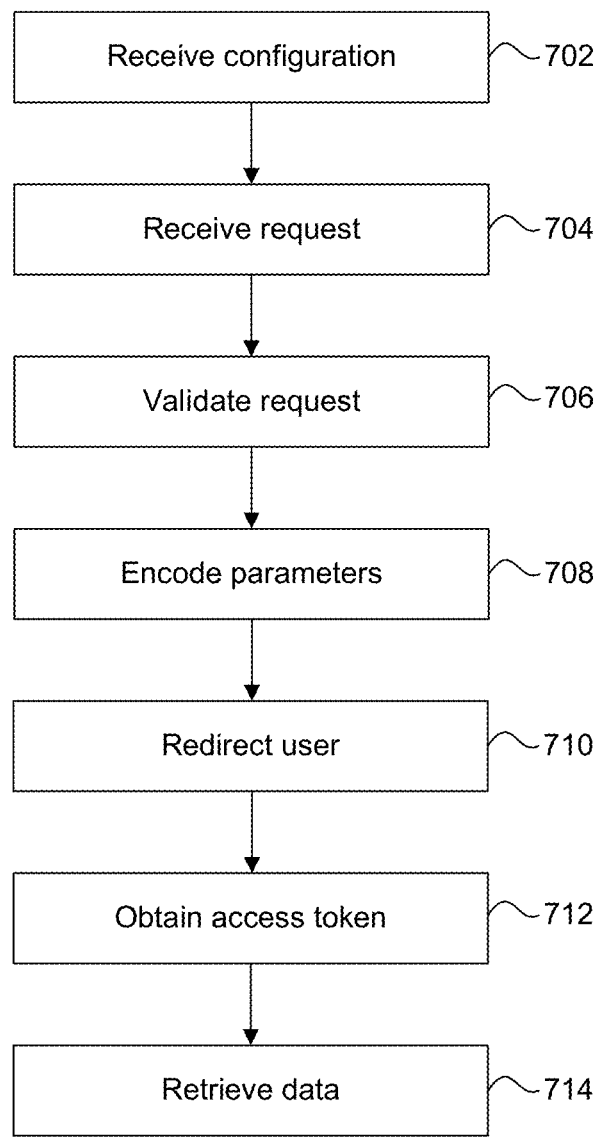
FIG. 7 is a flowchart illustrating a method of retrieving external data by a live application embedded in a cloud collaboration platform, according to some embodiments.

FIG. 7 is a flowchart illustrating a method 700 of retrieving external data by a live application embedded in a cloud collaboration platform, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art(s).

In 702, cloud collaboration platform 110 may receive an authentication configuration from a user. The authorization configuration may specify external resources from which the non-sandboxed third-party live application may retrieve data. For example, an authentication configuration may include parameters for: Name, Authorization URL, Client ID, Client Secret, OAuth Token URL, OAuth Scope, and Proxy API Domains.

In 704, cloud collaboration platform 110 may receive a request in a live application to access external data. The request may include an OAuth URL generated for each live application. External data may be tasklists, data lakes, data repositories, databases, and other cloud systems. In one example, the external data may be JIRA tasklist information. In such an example, users 102 may select an action that triggers the external resource. In the "My Tasklist" example, users 102 may update a task status from "To Do" to "In Progress," and the live application may access the external resource to send an update information the external resource so that the data remains synchronized.

In 706, cloud collaboration platform 110 may validate the request. In an embodiment, cloud collaboration platform 110 may compare configuration information stored in data 122 describing the live application and the configured authentication information to validate the request. In an alternate embodiment, cloud collaboration platform 110 may validate the request using SSL or another standard security protocol.

In 708, cloud collaboration platform 110 may encode URL parameters to the authorization URL. These URL parameters may include: client_id, client_secret, response_type, scope, state, and others. In an embodiment, these encoded URL parameters may be appended to the OAuth URL received in 704.

In 710, cloud collaboration platform 110 may perform a redirect to the OAuth URL with the specified parameters. The redirect may allow cloud collaboration platform 110 to embed a communication with the external data source inside of a document. From the users' perspectives, this may occur without conducting a page reload.

In 712, cloud collaboration platform 110 may receive an access token. An access token may be used by cloud collaboration platform 110 to formulate and send an API request of the external data source. The access token may specify authorizations for the application to specific data components in the external data system. The nature of the access tokens may vary based on the external data source being examined, as one skilled in the relevant art(s) will understand.

In 714, cloud collaboration platform 110 may retrieve data from the external data source to be used in the live application. Cloud collaboration platform 110 may formulate a request to the data contained in the external data source and receive the data in return. Cloud collaboration platform 110 may then display the data, transform the data, or perform additional behaviors using the data.

Figure 8:
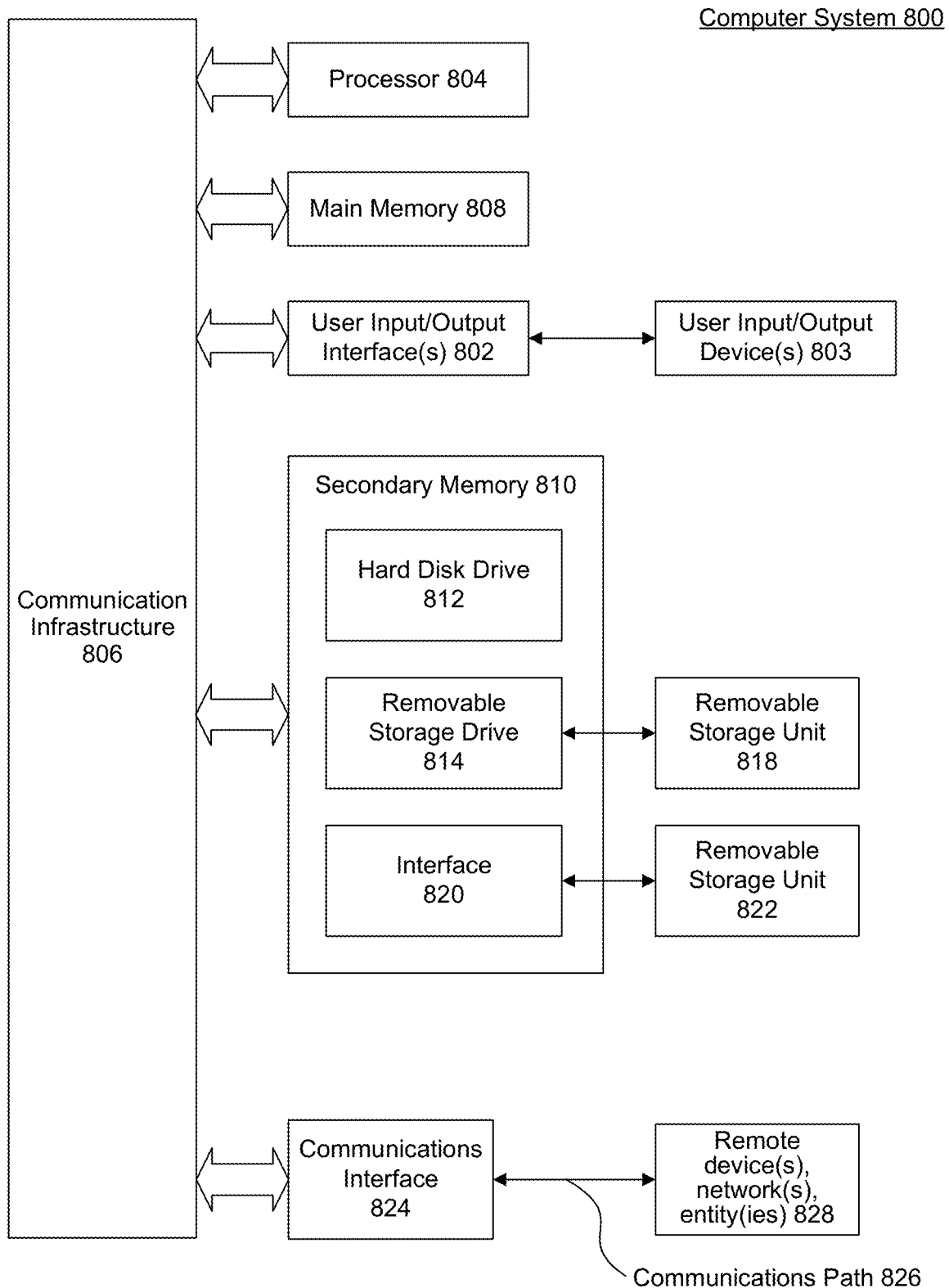
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 808, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

instantiating, by one or more processors, a live application that is embedded in a document opened hi a cloud collaboration platform within a frame of the opened document, wherein the live application is associated with a type, and wherein the live application is a customizable software application that performs programmed behaviors within the document;

associating, by the one or more processors, the live application with a subdomain based on the type; and serving, by the one or more processors, the frame from a different domain than the document, wherein the different domain includes the subdomain, and wherein the cloud collaboration platform exposes a data set to the live application through an application programming interface based on the subdomains.

2. The method of claim 1, further comprising:

applying, by the one or more processors, a sandbox attribute in the frame, wherein the sandbox attribute limits actions performable by the live application within the frame.

3. The method of claim 1, further comprising:

applying, by the one or more processors, a content-security policy to the frame, wherein the content-security policy limits content outside of the cloud collaboration platform that the live application can access.

4. The method of claim 1, further comprising:

employing, by the one or more processors, a bridge application programming interface to facilitate communication between the frame and the document.

5. The method of claim 1, further comprising:

receiving, by the one or more processors, an input in the live application in the frame;

processing, by the one or more processors, the input to determine auto-complete values; and rendering, by the one or more processors, a response to the input in the frame including the auto-complete values.

6. The method of claim 1, further comprising:

sharing, by the one or more processors, account information and document information with the live application; and restricting, by the one or more processors, access to other data used by the cloud collaboration platform.

7. The method of claim 1, further comprising:

receiving, by the one or more processors, an exception for an external resource for the live application;

adding, by the one or more processors, the exception to a content-security policy applied to the frame; and accessing, by the one or more processors, the external resource to retrieve the resource.

8. A system, comprising:

a memory; and at least one processor coupled to the memory and configured to:

instantiate a live application that is embedded in a document opened in a cloud collaboration platform within a frame of the opened document, wherein the live application is associated with a type, and wherein the live application is a customizable software application that performs programmed behaviors within the document;

associate the live application with a subdomain based on the type; and serve the frame from a different domain than the document, wherein the different domain includes the subdomain, and wherein the cloud collaboration platform exposes a data set to the live application through an application programming interface based on the subdomain.

9. The system of claim 8, the at least one processor further configured to:

apply a sandbox attribute in the frame, wherein the sandbox attribute limits actions performable by the live application within the frame.

10. The system of claim 8, the at least one processor further configured to:

apply a content-security policy to the frame, wherein the content-security policy limits content outside of the cloud collaboration platform that the live application can access.

11. The system of claim 8, the at least one processor further configured to:

employ a bridge application programming interface to facilitate communication between the frame and the document.

12. The system of claim 8, the at least one processor further configured to:

receive an input in the live application in the frame;
process the input to determine auto-complete values; and
render a response to the input in the frame including the auto-complete values.

13. The system of claim 8, the at least one processor further configured to:

share account information and document information with the live application; and
restrict access to other data used by the cloud collaboration platform.

14. The system of claim 8, the at least one processor further configured to:

receive an exception for an external resource for the live application;
add the exception to a content-security policy applied to the frame; and
access the external resource to retrieve the resource.

15. A non transitory computer-readable device having instructions stored thereon that, when executed by at least one computing device, causes the at least one computing device to perform operations comprising:

instantiating a live application that is embedded in a document opened in a cloud collaboration platform within a frame of the opened document, wherein the live application is associated with a type, and wherein the live application is a customizable software application that performs programmed behaviors within the document;

associating the live application with a subdomain based on the type; and serving the frame from a different domain than the document, wherein the different domain includes the subdomain, and wherein the cloud collaboration platform exposes a data set to the live application through an application programming interface based on the subdomain.

16. The non-transitory computer-readable device of claim 15, the operations further comprising:

applying a sandbox attribute in the frame, wherein the sandbox attribute limits actions performable by the live application within the frame.

17. The non-transitory computer-readable device of claim 15, the operations further comprising:

applying a content-security policy to the frame, wherein the content-security policy limits content outside of the cloud collaboration platform that the live application can access.

18. The non-transitory computer-readable device of claim 15, the operations further comprising:

employing a bridge application programming interface to facilitate communication between the frame and the document.

19. The non-transitory computer-readable device of claim 15, the operations further comprising:

receiving an input in the live application in the frame;
processing the input to determine auto-complete values; and
rendering a response to the input in the frame including the auto-complete values.

20. The non-transitory computer-readable device of claim 15, the operations further comprising:

sharing account information and document information with the live application; and
restricting access to other data used by the cloud collaboration platform.

* * * * *